United States Patent Office 3,719,240
Patented Mar. 6, 1973

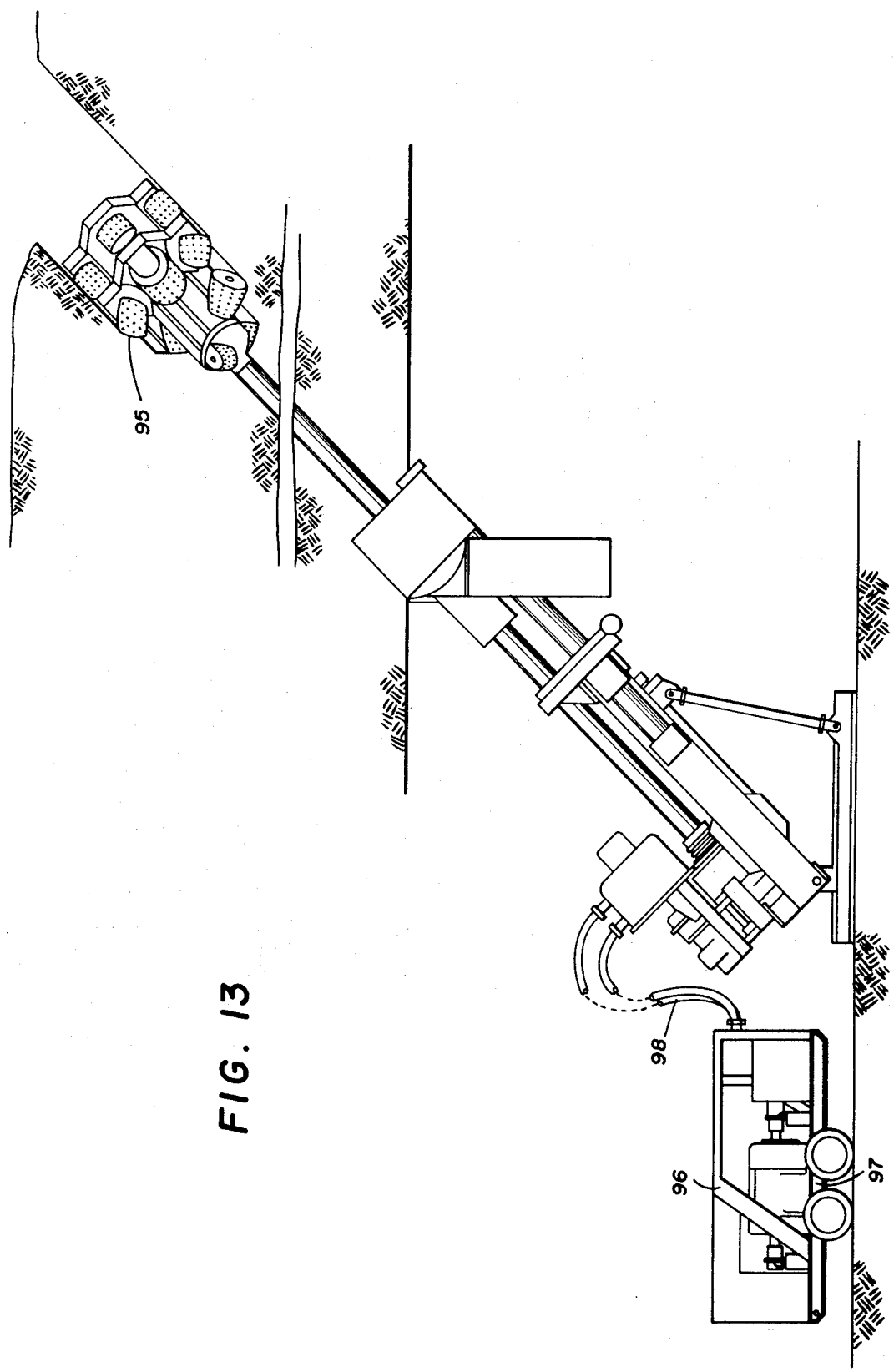

3,719,240
EARTH BORING MACHINE
James W. Young, Irving, and George A. Cason, Jr., Dallas, Tex., and Ernest O. Kunkel, Nevada, Mo., assignors to Dresser Industries, Inc., Dallas, Tex.
Original application Feb. 2, 1970, Ser. No. 7,923. Divided and this application Oct. 29, 1971, Ser. No. 193,870
Int. Cl. E21c 7/00
U.S. Cl. 175—207
1 Claim

ABSTRACT OF THE DISCLOSURE

An apparatus for boring large diameter holes. A drilling mechanism is pivotally mounted on a base and arranged so that it may drill at any angle from the horizontal, either up or down. Means are provided to divert the drilling residue and loose rock and a drill pipe positioning system installs and removes sections of the drill pipe.

BACKGROUND OF THE INVENTION

This is a division of application Ser. No. 7,923 filed Feb. 2, 1970.

This invention relates to the art of earth boring and more particularly to an apparatus for boring large diameter holes. The operation generally proceeds by the drilling of a small pilot hole followed by enlargement to the desired size by a reaming operation.

The invention has specific utility in raise drilling, but also is useful in other mining operations such as driving a pilot hole for shaft sinking, for tunneling or boring emergency exits. The invention may also be applied to operations other than mining and in general may be applied to earth boring whether conducted above or below the earth's surface.

Raise drilling is the term used to denote the opening of a passageway between two levels of an underground mine. A raise may be used for ventilation purposes, connecting stopping levels, as an ore pass, for waste transfer, as an entrance or exit or for any other operation wherein a passageway is required. A raise may be vertical or at an angle to the vertical. The stringent requirements of raise drilling limit the size of the overall drilling apparatus, impose fixed environmental parameters and impose limitations on servicing and repair. Among the many requirements is the need for a simple and compact machine that will operate reliably in the confines of an underground area. The machine should be self-contained and yet be able to operate with limited ventilation. In addition, the machine must be adaptable to being moved in the elevators and narrow passageways of a mine. The need for simplicity, reliability and safety is extremely important and this must be provided without reducing the mechanical operation of the machine.

DESCRIPTION OF THE PRIOR ART

Prior art systems of raise drilling have been slow, dangerous and the quality of the raise produced has been low. These prior art systems have included the blast method of driving raises and more recently the Alimak Climber. Prior art systems of mechanized raise drilling, while an improvement over earlier systems, have been bulky and inefficient. These prior art mechanized raise drilling systems are represented by the systems shown in U.S. Pat. No. 3,460,638 to Millsapps, Jr. and U.S. Pat. No. 3,220,494 to Cannon et al.

SUMMARY OF THE INVENTION

This invention provides an improved apparatus that can bore a large diameter hole either up or down and at any angle to the vertical. A pair of support columns are pivotally mounted on a base. A carriage is mounted for up and down movement along the support columns and carries the drilling equipment. Means are provided for stabilizing the drilling apparatus and the formations. Control and removal of cuttings and drilling residue are included. Means are provided to place drill pipe in position for drilling and for removing drill pipe from the drill string.

It is therefore an object of the present invention to provide an improved earth boring apparatus.

It is a further object of the present invention to provide an improved raise drilling apparatus.

It is a still further object of the present invention to provide an earth boring apparatus that can drill either up or down and at any angle to the horizontal.

It is a still further object of the present invention to provide an earth boring apparatus that is compact and self-contained.

It is a still further object of the present invention to provide a raise drilling apparatus that includes support for the formations and stabilization of the machine.

It is a still further object of the present invention to provide a raise drilling apparatus that includes control of the drilling residue and cuttings.

It is a still further object of the present invention to provide an earth boring apparatus that includes a drill pipe positioning system.

The above and other objects and advantages will become apparent from a consideration of the following detailed description when taken in conjunction with the accompanying drawing.

BRIEF DESCRIPTION OF THE DRAWING

FIG. 4 shows a guide bushing that may be attached to the reaction post.

FIG. 13 shows the boring machine in position reaming down at an angle.

DETAILED DESCRIPTION OF THE INVENTION

Figure 1:
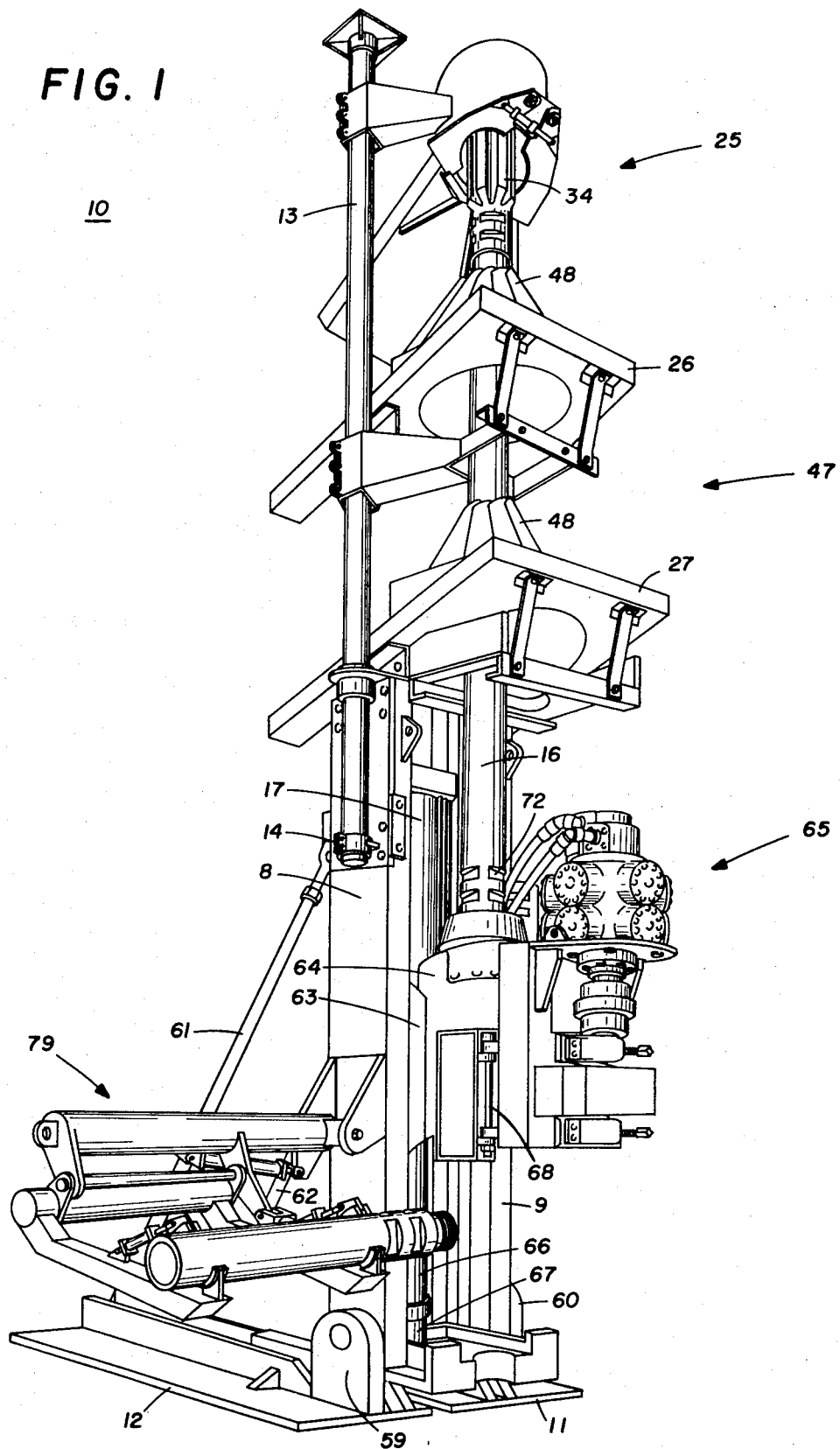
FIG. 1 is a perspective view of one embodiment of the boring machine.

Referring now to the drawing and in particular to FIG. 1, a boring machine indicated generally by reference numeral 10 is anchored to the ground by base elements 11 and 12. In order to be certain that the boring machine is firmly affixed to the ground, a concrete foundation pad may be installed and the base elements 11 and 12 firmly attached thereto. When the boring machine is used for drilling raises or for other operations in an underground tunnel, adit, drift or other passageway; a telescoping reaction post 13 may be provided to give additional stability to the boring machine 10 and support to the overhead formations. The reaction post 13 extends to the ceiling and is held in place by a clamping bracket 14 mounted on one of the support columns 8 or 9.

Figure 2:
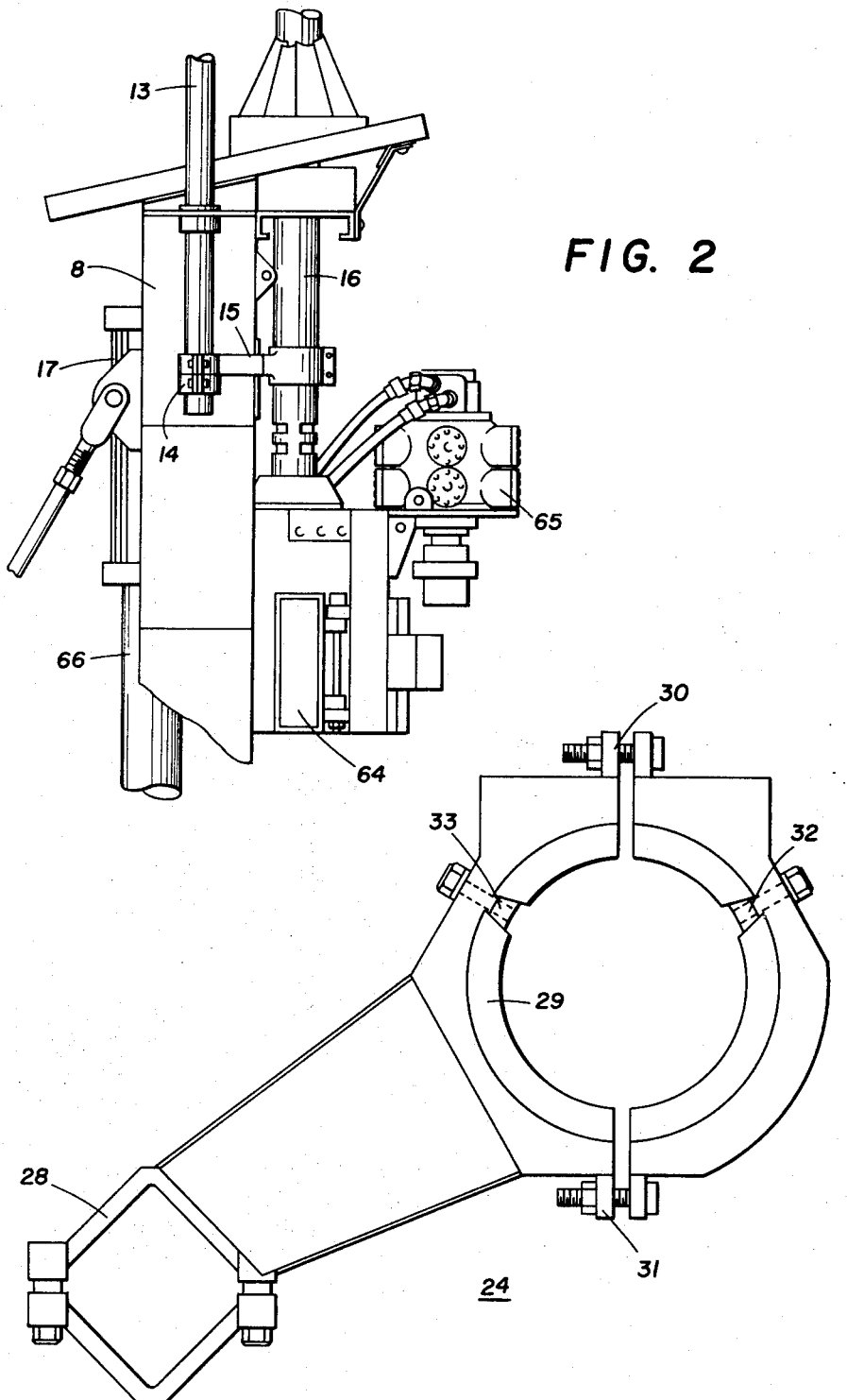
FIG. 2 illustrates a pressure bracket for positioning a reaction post.

In order to seat the reaction post, clamping bracket 14 may be loosened, thereby allowing reaction post 13 to slide. A pressure bracket 15 shown in FIG. 2 is attached to the drill column 16 and connected to reaction post 13. By actuation of the main thrust cylinder 17, upward force from the drill string may be transmitted to reaction post 13 and the reaction post seated firmly in the ceiling. Clamping bracket 14 is then tightened and the boring machine 10 is in place for operation.

Figure 3:
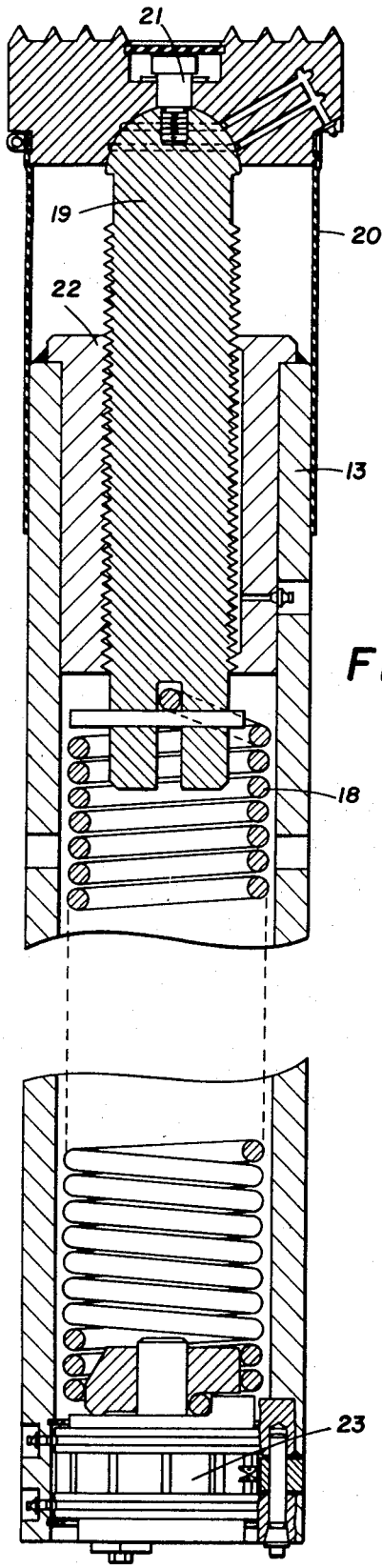
FIG. 3 shows the reaction post, spring and jack screw.

Included with reaction post 13 is a means of automatically applying torque to a jack screw mounted therein to provide and maintain a rigid support member that resists any tendency to loosen or vibrate. As shown in FIG. 3, a spring 18 and jack screw 19 housed within the reaction post 13 constantly apply a force to stabilize the machine and compensate for any fretting action or deflection in the face of the formation being drilled. A cylindrical cover 20 with an open bottom end fits over the top of reaction post 13 to protect the internal parts from debris. The top of cover 20 is seated in the ceiling according to the procedure previously described. The jack screw 19 is attached to cover 20 by a swivel means 21 thereby allowing jack screw 19 to turn with cover 20 remaining in place. A threaded portion 22 of reaction post 13 mates with the threads on jack screw 19 and as jack screw 19 turns the vertical length of the overall support member is extended. The force to turn the jack screw is stored and transmitted by spring 18. With several turns built into the spring 18, the jack screw 19 has the capability of extending to maintain stability of the machine. The make up torque may be applied to the spring by hand or by actuating a drive motor (not shown) geared to supply the necessary force. In the embodiment shown, a ratchet mechanism 23 is attached to the opposite end of spring 18 thereby allowing the operator to make up the spring with a wrench.

The reaction post 13 provides support for a guide bushing 24 (shown in FIG. 4), a hopper 25 and packers 16 and 17. Clamping brackets are a part of each of these elements allowing them to be mounted on the reaction post. The clamping brackets are adjustable so that the position of the elements along reaction post 13 may be changed by loosening the clamps.

Referring now to FIG. 4, the guide bushing 24 provides a means of stabilizing the drill column and is especially useful when spudding in because the distance between the rotary head and the ceiling requires a greater length of drill string than when drilling down. The adjustability of clamping bracket 28 allows the bushing to be placed close to the rock face being drilled and to be removed from the reaction post after the guide bushing is no longer needed. The bushing material 29 may be any suitable material, for example brass. The guide bushing is split into halves so that it may be removed from the drill pipe without withdrawing the entire drill string. The two halves of the guide bushing are held together by connections 30 and 31. The guide bushing material 29 is held in place by adjustable elements 32 and 33. The adjustability of elements 32 and 33 allows guide bushing element 29 to be removed and other similar elements inserted in its place. This provides a means of replacing worn or damaged bushings and allows the size of the opening to be changed. Although the guide bushing 24 is shown as connected to the reaction post 13, it is to be understood that the guide bushing 24 may also be attached to the support columns or upper slip tables.

When drilling up, the drilling residue and cuttings must be diverted from the boring machine and controlled to provide safety to the operating personnel and to protect the boring machine. A hopper 25 is provided to deflect some of the residue and cuttings and in general may be expected to handle the larger debris. A first packer 26 and second packer 27 are positioned below the hopper 25 to handle the remaining debris. The hopper and packers must be adjustable to handle the various elements of the drill string with diameters larger than the drill pipe. For example, the stabilizer element 34 being moved through hopper 25 in FIG. 1 is substantially larger than the drill pipe. Although adjustable the hopper and packers must insure that all of the debris coming down the hole is diverted. Further control of the debris may be according to systems used in underground mines such as an endless belt or mechanized loaders.

Figure 5:
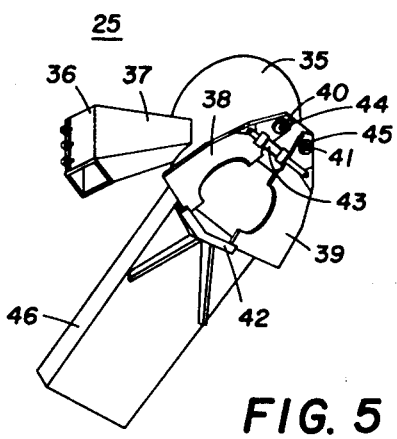
FIG. 5 illustrates a hopper used to deflect drilling residue and cuttings.

Referring now to FIG. 5, the hopper 25 includes a main cylindrical body 35 open at both ends. The hopper is attached to reaction post 13 by clamp 36 and arm 37. Two symmetrical deflection elements 38 and 39 are pivotally connected to the main body 35 by pins 40 and 41. A plate 42, connected to the main body 35, gives additional support to deflection elements 38 and 39 and at the same time allows them to slide in order to provide adjustment in size of the central opening. A double acting pneumatic or hydraulic cylinder 43 controls the size of the central opening and it can be appreciated that as various elements of the drill string are moved through hopper 25 the deflection elements may be adjusted to provide optimum control of debris. Rubber bushings 44 and 45 are provided to give a certain amount of flexibility to the deflection elements. The debris is first diverted by deflection elements 38 and 39 and then channeled to a disposal area by means of a chute 46. The deflection elements and chute are slanted to provide better control of the debris.

Referring again to FIG. 1, a packer system 47 is installed below the hopper. This consists of one or more assemblies surrounding the drill string and supported by reaction post 13. This system includes a series of overlapping leaves 48 shaped in a conical fashion, the upper lips of which contact the drill column 16. As the stabilizer 34 or drill string sections of different size pass through each packer, the leaves are deflected outwardly by tapered engagement with the enlarged section. A spring arrangement may be provided for keeping positive engagement against the drill string at all times. Any fluid or slurry not deflected by the hopper 25 is trapped and deflected away from the boring machine by packers 26 and 27. For the most effective seal, two packers should be used with the spacing between packers sufficient to span the length of the stabilizer or other enlarged drill string elements so that one of the packers is in contact with the drill rod at all times, however, it is to be understood that a single packer could also be used.

Figure 6:
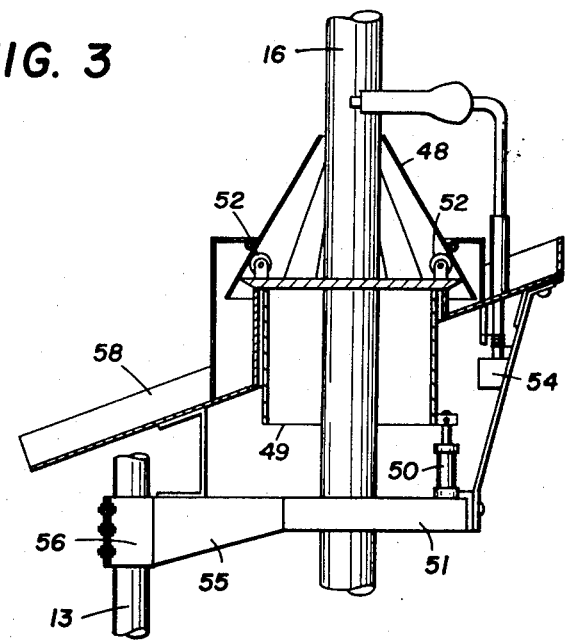
FIG. 6 shows an embodiment of one of the packers.

Referring now to FIG. 6, another embodiment of one of the packers is shown that includes means to automatically open the overlapping leaves. A cylindrical drum 49 open at both ends is centralized in the packer and adapted for up and down movement. A hydraulic or pneumatic cylinder 50 connected between brace 51 and drum 49 provides the force required to move the drum 49. A single hydraulic or pneumatic cylinder 50 is shown for illustration purposes but it is to be understood that a plurality of such cylinders may be provided to insure smooth and uniform operation. Rollers 52 are connected to the upper edge of drum 49 to reduce friction between drum 49 and leaves 48 as drum 49 is moved upward. Actuation of cylinder 50 may be accomplished manually or by means of an automatic system that detects drill string elements having an enlarged diameter. One means of detecting the oncoming enlarged diameter drill string elements is an arm and roller element 53. This element 53 extends into the central opening and contacts the drill string elements as they move through the packer. When an enlarged element such as stabilizer 34 comes into contact with the arm and roller element 53 they will be deflected. This deflection movement is transmitted to switching element 54 which in turn actuates cylinder 50. Cylinder 50 moves upward until rollers 52 contact the overlapping leaves 48. Further upward movement of drum 49 causes leaves 48 to pivot and open to allow the enlarged element to pass therethrough. The packer element is connected to reaction post 13 by arm 55 and clamp 56. The main body 57 of the packer may be slanted and includes a raised outer lip to contain debris diverted by leaves 48. A chute 58 transmits the debris to a disposal area.

Referring again to FIG. 1, support columns 8 and 9 are pivotally connected to the base elements 11 and 12 by hinges 59 and 60. Braces 61 and 62 extend between base elements 11 and 12 and support columns 8 and 9. It can be appreciated that the length of the braces 61 and 62 determines the angle the support columns make with the horizontal and consequently the drilling angle. It is therefore possible to adjust the support column angle for various drilling operations by replacing braces 61 and 62 with braces of a different length. Accordingly drilling may proceed at any angle to the vertical and may even include horizontal drilling.

A carriage 63 is mounted for up and down travel along the support columns. The carriage extends between support columns 8 and 9. Each support column includes means to guide the carriage during up and down travel. The guide means may include rollers attached to the carriage that are seated in a guide track extending along the length of the support columns or some other suitable guide means. The carriage 63 supports a drill head assembly 64 and a power cage assembly 65. The main thrust cylinder 17 provides the force necessary to move the carriage along the support columns. The thrust cylinder 17 may be a double-acting hydraulic cylinder that will provide thrust in either direction during operation of the boring machine. The body of thrust cylinder 17 is attached to the carriage 63 and the piston 66 is connected to a cross frame 67 extending between support columns 8 and 9 and firmly affixed thereto. Fluid to actuate the thrust cylinder is provided by a central power unit and transmitted to the thrust cylinder by conventional means. It is to be understood that control and operation of the various elements may be according to means well known in the art.

Figure 7:
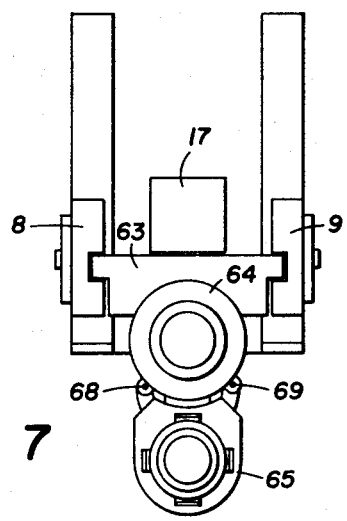
FIG. 7 is a top view of the carriage, drill assembly and power assembly.

The drill head assembly 64 and power cage assembly 65 are supported by carriage 63 and adapted to be easily changed from drilling up to drilling down. This may be best shown by reference to FIGS. 1 and 7. The power cage 65 is attached to the drill head unit 64 by two pin connections 68 and 69 and a transmission unit interconnects drill head unit 64 and power cage 65. This transmission may be a chain drive, gear drive or other transmission system. The carriage is first lowered to approximately the ground level, the transmission disconnected and the power cage removed. Removal of the power cage is easily accomplished by disconnecting one of the pin connections and then pivoting the power cage to one side. For example, pin 68 may be removed and the power cage 65 pivoted to one side. Movement of the main thrust cylinder 17 then allows the power cage 65 to be positioned on a receiving unit next to the boring machine. The other pin 69 is disconnected and the power cage is completely removed. The carriage 63 is raised to the top of support columns 8 and 9 until it is out of the guide tracks. The drill head 64 and carriage 63 are then turned 180° and reinserted in the guide tracks. The drill head is now ready for drilling down. Carriage 63 is lowered and the power cage attached by reversing the procedure previously explained. It can be appreciated that the drill head could also be reversed by removing the connections between carriage 63 and drill head 64.

Figure 8:
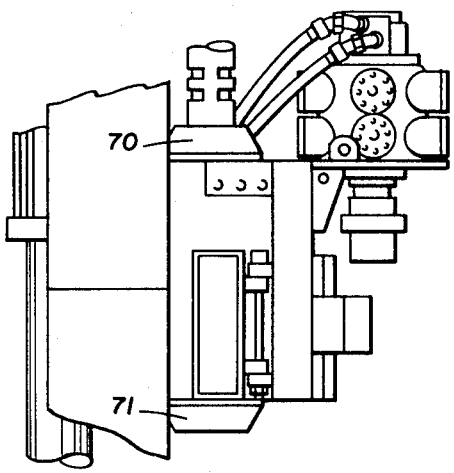
FIG. 8 is a side view of another embodiment of the drill head.

In another embodiment, shown in FIG. 8, the drill head has a chuck for holding the drill pipe at each end that can be used for up or down drilling without requiring reversal of the drilling head. A chuck 70 is provided on the top of the drill head for overhead drilling according to the procedures previously explained. In addition, a second chuck 71 is provided at the lower end to be used when drilling down. The other elements of this embodiment may be provided as described previously.

Figure 9:
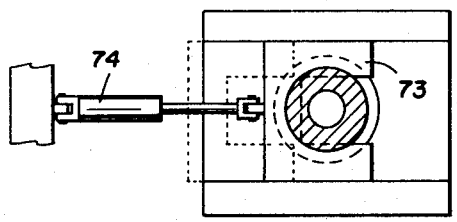
FIG. 9 is a top view of one of the slip tables.

As shown in FIG. 1, each section of the drill pipe has at least one set of flats 72 that may be used when adding or removing pipe from the drill string. During drilling operations the connections between sections of drill pipe may become extremely tight and require the application of high torque to break the connection. This is accomplished by a slip table located on a cross bar that extends between support columns 8 and 9. As best shown in FIG. 9 the slip table includes a generally U-shaped slip 73 that may be moved into position in flats 72 to hold a section of the drill pipe against rotational movement as torque is applied to loosen the connection. By reversing the drive mechanism or other suitable means of applying torque to the adjacent drill pipe section such as that shown in U.S. Pat. No. 3,446,284 to N. D. Dyer, et al., the connection may be broken. The slip table also serves to hold the weight of the drill string as each section of drill pipe is being removed. Movement of slip 73 may be accomplished by a double-acting hydraulic cylinder 74 or other suitable means.

Figure 10:
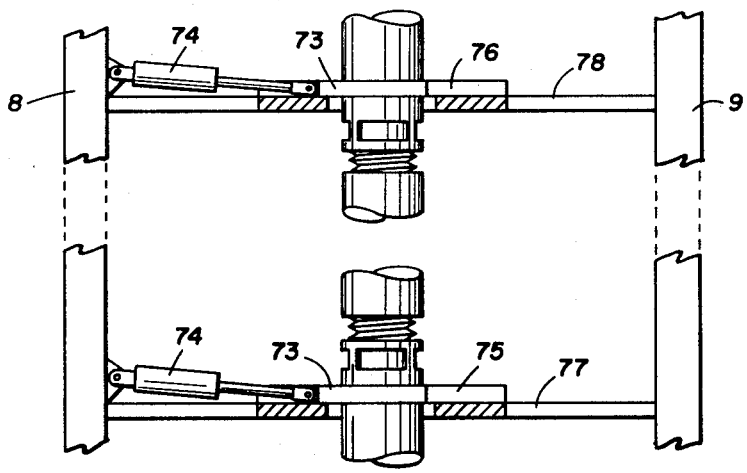
FIG. 10 is a front view of the boring machine showing both of the slip tables.

With reference to FIG. 10, the boring machine 10 is provided with a pair of slip tables 75 and 76 to accommodate both up and down drilling. Lower slip table 75 is mounted below the drill head on a cross frame 77 that extends between support columns 8 and 9. When drilling down this slip table 75 is used to hold the drill pipe from rotation according to the procedure previously explained. Upper slip table 76 is mounted on a cross frame 78 above the drill head and is used when drilling up. Both slip tables include a hydraulic or pneumatic cylinder 74 for moving the U-shaped slip 73.

Figure 11:
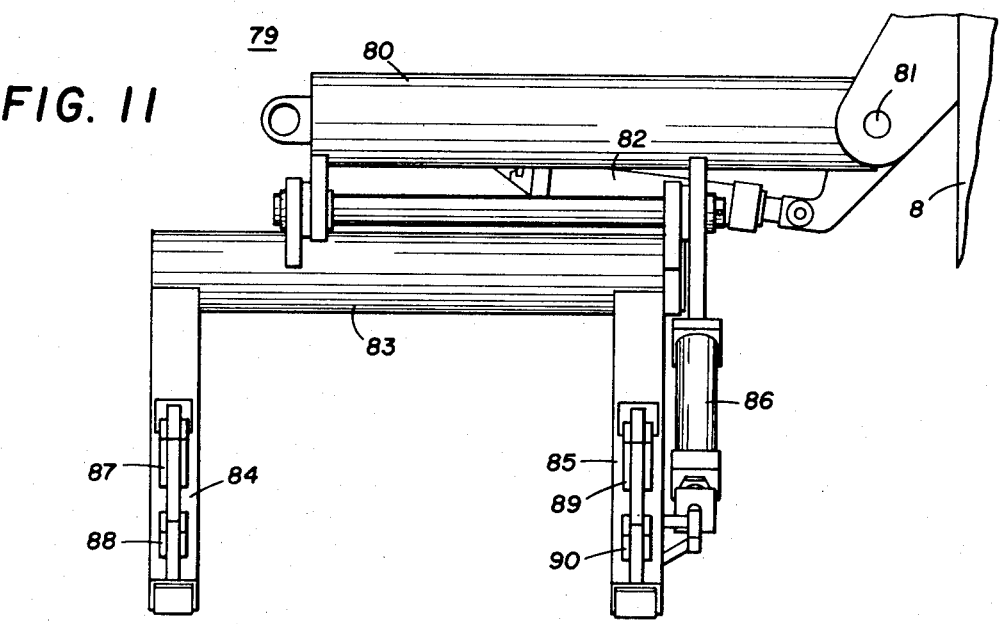
FIG. 11 is a front view of the drill pipe positioner.
Figure 12:
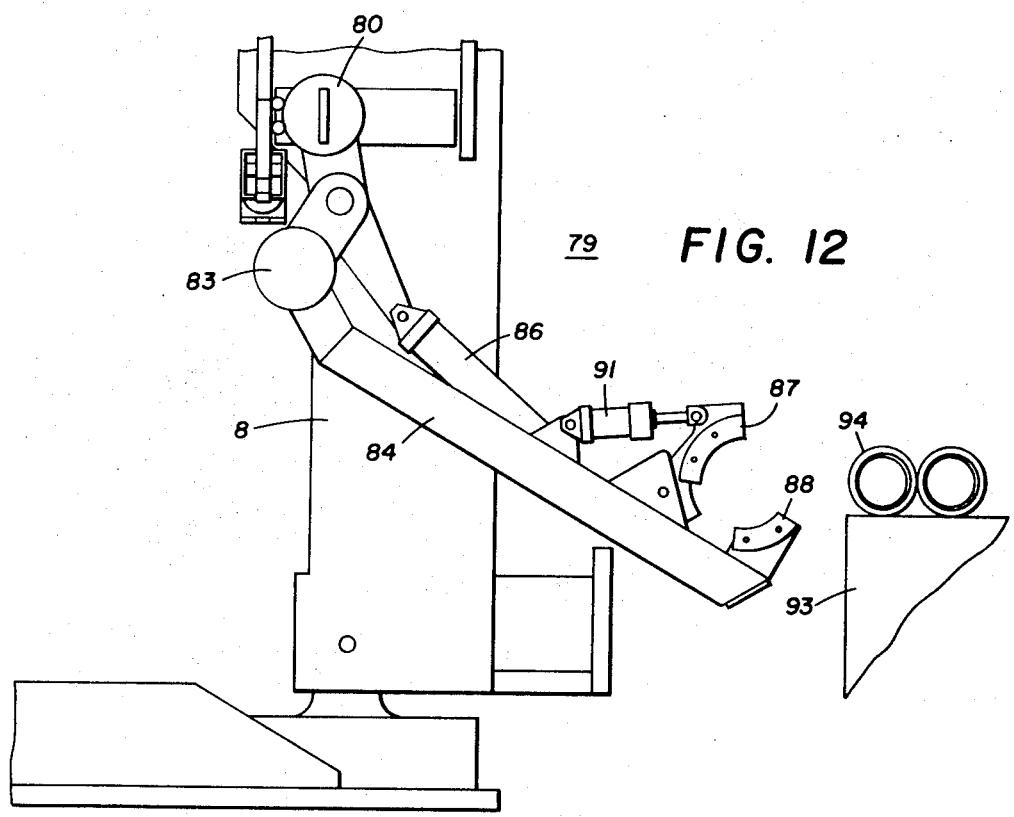
FIG. 12 is a side view of the drill pipe positioner including a rack with drill pipe.

Addition or removal of drill pipe sections to the drill string may be accomplished by means of a drill pipe positioner indicated generally by reference numeral 79. The drill pipe positioner 79 will lift, position and release the drill pipe in proper relation to the drill head 64 and other portions of the drill string and by reversing the action will attach to the drill pipe, lift and release it for removal and stacking. This allows one operator to accurately pick up, lift and position the sections of drill pipe because the precision positioning allows a hands-off make up and break out of the drill string. As best shown in FIGS. 11 and 12, a main arm element 80 is pivotally attached to one of the support columns 8 by hinge 81. A hydraulic cylinder 82 is connected between arm 80 and the support column 8 and supplies the force to move arm 80. An intermediate arm element 83 including a pair of parallel arms 84 and 85 is pivotally attached to arm 80 and a double-acting hydraulic cylinder 86 is connected so as to provide movement of the intermediate arm element. Attached to each of arms 84 and 85 are gripper elements 87, 88, 89, and 90. Double-acting hydraulic cylinders 91 and 92 provide movement of gripper elements 87 and 89. It is to be understood that other gripping means may also be used, for example, an electromagnetic gripping unit.

As shown in FIG. 12, the sections of drill pipe are held by rack 93. With arm 80 in the horizontal position hydraulic cylinder 86 is actuated thereby moving intermediate arm element 83 and parallel arms 84 and 85 until gripper elements 88 and 90 come into contact with a section of drill pipe 94 on rack 93. Then hydraulic cylinders 91 and 92 are actuated to move and lock gripper elements 87 and 89 firmly onto drill pipe section 94. Hydraulic cylinder 82 may then be actuated to tilt drill pipe section 94 and position it parallel to the support column 8. Hydraulic cylinder 86 is then actuated to move drill pipe section 94 into alignment with the drill string and rotary head 64. The carriage is moved to make contact between the rotary head 64 and the drill pipe section 94. Rotation of rotary head 64 produces engagement of the threads on rotary head 64 and mating threads on the drill pipe section. Further rotation of rotary head 64 produces mating of the threads between the drill pipe section 94 and the drill string. The operation previously explained is simply reversed when the drill pipe sections are being removed from the drill string.

A fail safe feature is provided to insure that the gripper elements 87 and 89 are firmly connected to the drill pipe when the pipe is moved. This system is best understood by considering the overall hydraulic or pneumatic system. A one way check valve is located in the line to cylinders 91 and 92 connected to the gripper elements. Fluid from these cylinders can only be dumped through a pilot valve in a line that bypasses the one way check valve. The pilot valve is actuated from the control panel when the gripper elements are to be released. This insures that the drill pipe will not be dropped during handling.

The fluid system also includes choke valves in the lines to cylinders 82 and 86. This limits the speed of arms 80, 84, and 85 and insures that the drill pipe will not be slammed into position.

The drill pipe positioner 79 provides a simple and yet reliable automatic system of handling drill pipe and can be operated by one man. It can be appreciated that the system is operative regardless of the drilling angle or direction of drilling and will provide accurate positioning of the drill pipe from a rack located near the boring machine. Because the system provides a floating effect during make up of a section of drill pipe with the drill string, it prevents damage to the drill pipe threads.

Referring now to FIG. 13, the boring machine is shown in position in an underground mine reaming down at an angle to the vertical. A pilot hole has been drilled upward to an opening above and the bit removed. A reamer bit 95 is attached to the drill string and the operation proceeds by reaming downward. The main power unit 96 is shown on a movable transport 97. Hydraulic or pneumatic hoses 98 connect the various elements and supply the power for operation.

Although the boring machine is shown drilling a raise that extends upward, it can be appreciated that a similar operation can be accomplished by drilling a pilot hole down to a mine opening below and subsequently reaming from the bottom upward. This invention provides a simple, compact and reliable system of accomplishing both operations. The safety aspect of the system of this invention is much better than systems of the prior art. The prior art systems have been very slow when compared to the systems of this invention and the finished passageway of this invention is of a much higher quality because it is smooth and requires very little if any additional work before being put into service.

The embodiments of the invention in which an exclusive property or privilege is claimed are defined as follows:

1. In an earth boring apparatus including support columns and drilling mechanism mounted for travel along said support columns, a packer positioned above the drilling mechanism comprising:
    a main body having a central opening therein,
    a plurality of movable deflection leaves around said opening, and
    means for moving said deflection leaves.

References Cited
UNITED STATES PATENTS
3,158,213   11/1964   O'Neill et al. _____ 175—85
3,559,739   2/1971    Hutchison _____ 175—207

JAMES A. LEPPINK, Primary Examiner